United States Patent [19]

Okada

[11] 4,275,901
[45] Jun. 30, 1981

[54] INFLATABLE SAFETY BAG SYSTEM FOR VEHICLES

[75] Inventor: Motohiro Okada, Asaka, Japan

[73] Assignee: Honda Giken Kogyo Kabushiki Kaisha, Tokyo, Japan

[21] Appl. No.: 59,278

[22] Filed: Jul. 20, 1979

[30] Foreign Application Priority Data

Jul. 21, 1978 [JP] Japan .................................. 53/89187
Jul. 24, 1978 [JP] Japan .................................. 53/90291
Aug. 2, 1978 [JP] Japan .................................. 53/94328

[51] Int. Cl.³ ............................................. B60R 21/02
[52] U.S. Cl. ...................................... 280/741; 73/708;
280/737; 280/735; 280/731
[58] Field of Search ............... 280/734, 735, 736, 737, 280/742, 731; 222/5; 137/70; 73/708

[56] References Cited

U.S. PATENT DOCUMENTS

| | | | |
|---|---|---|---|
| 3,630,413 | 12/1971 | Beckes et al. ............................ | 222/5 |
| 3,749,282 | 7/1973 | Day ........................................... | 280/737 X |
| 3,788,596 | 1/1974 | Maeda ...................................... | 280/737 X |
| 3,815,417 | 6/1974 | Smialowicz ............................. | 73/708 |
| 3,883,156 | 5/1975 | Frazier ..................................... | 280/737 X |
| 4,143,545 | 3/1979 | Sitabkhan ................................ | 73/708 |

Primary Examiner—John P. Silverstrim
Assistant Examiner—D. W. Underwood
Attorney, Agent, or Firm—Irving M. Weiner; Pamela S. Burt; John L. Shortley

[57] ABSTRACT

An inflatable safety bag system for vehicles which comprises an electrical actuator device for detecting a vehicle collision, a mechanical actuator device for detecting a vehicle collision, and a valve opening device for a high-pressure gas container for supplying high-pressure gas to a safety bag at the time of a vehicle collision. The electrical and mechanical actuator devices are operatively connected to the valve opening device, and are actuatable independently of each other. The valve opening operation of the high-pressure gas container is effected in response to actuation of at least one of the electrical and mechanical actuator devices. When the electrical actuator device fails to operate, the mechanical actuator device enables the safety bag to be inflated, thereby ensuring positive and reliable operation of the safety bag system.

12 Claims, 31 Drawing Figures

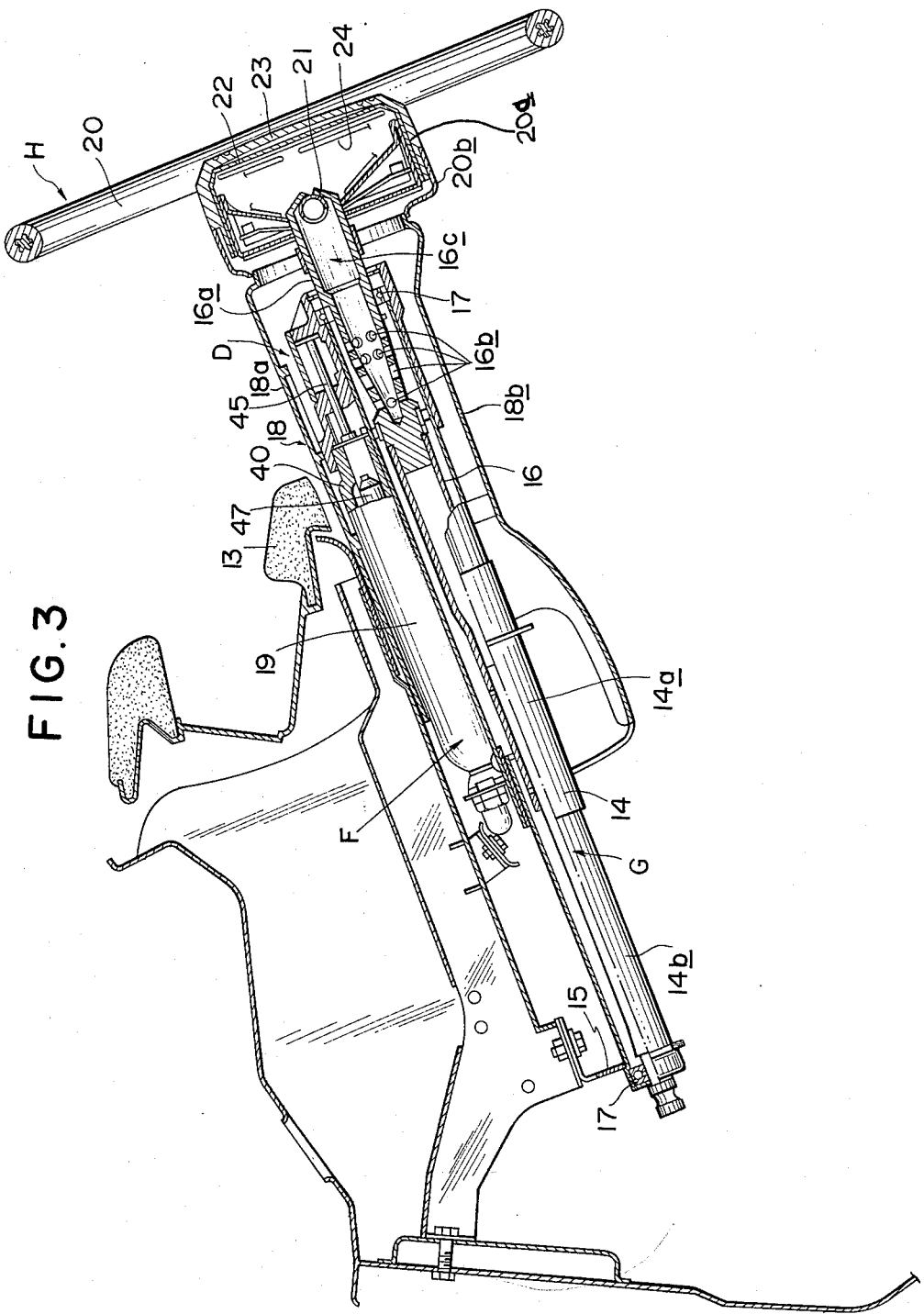

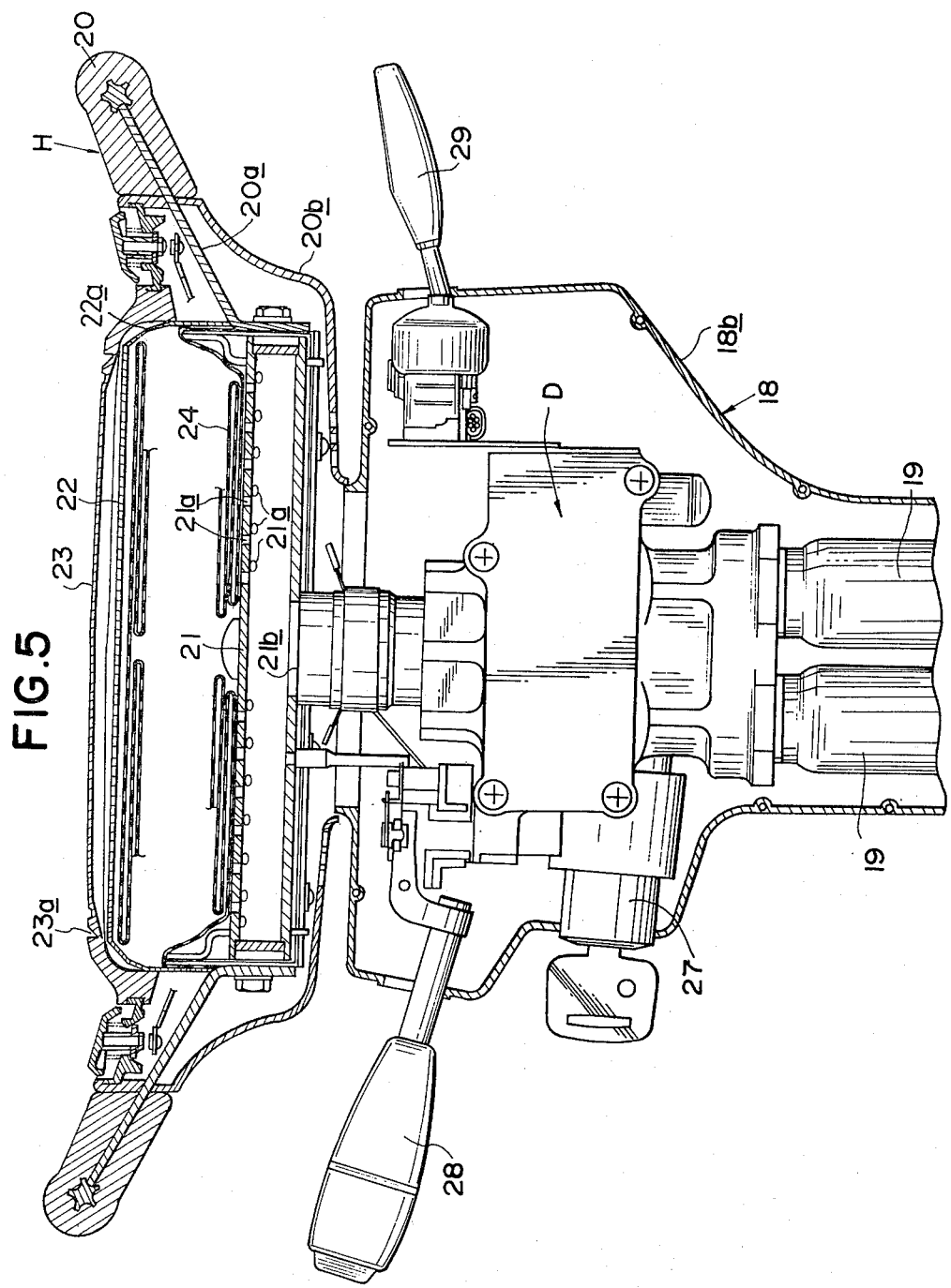

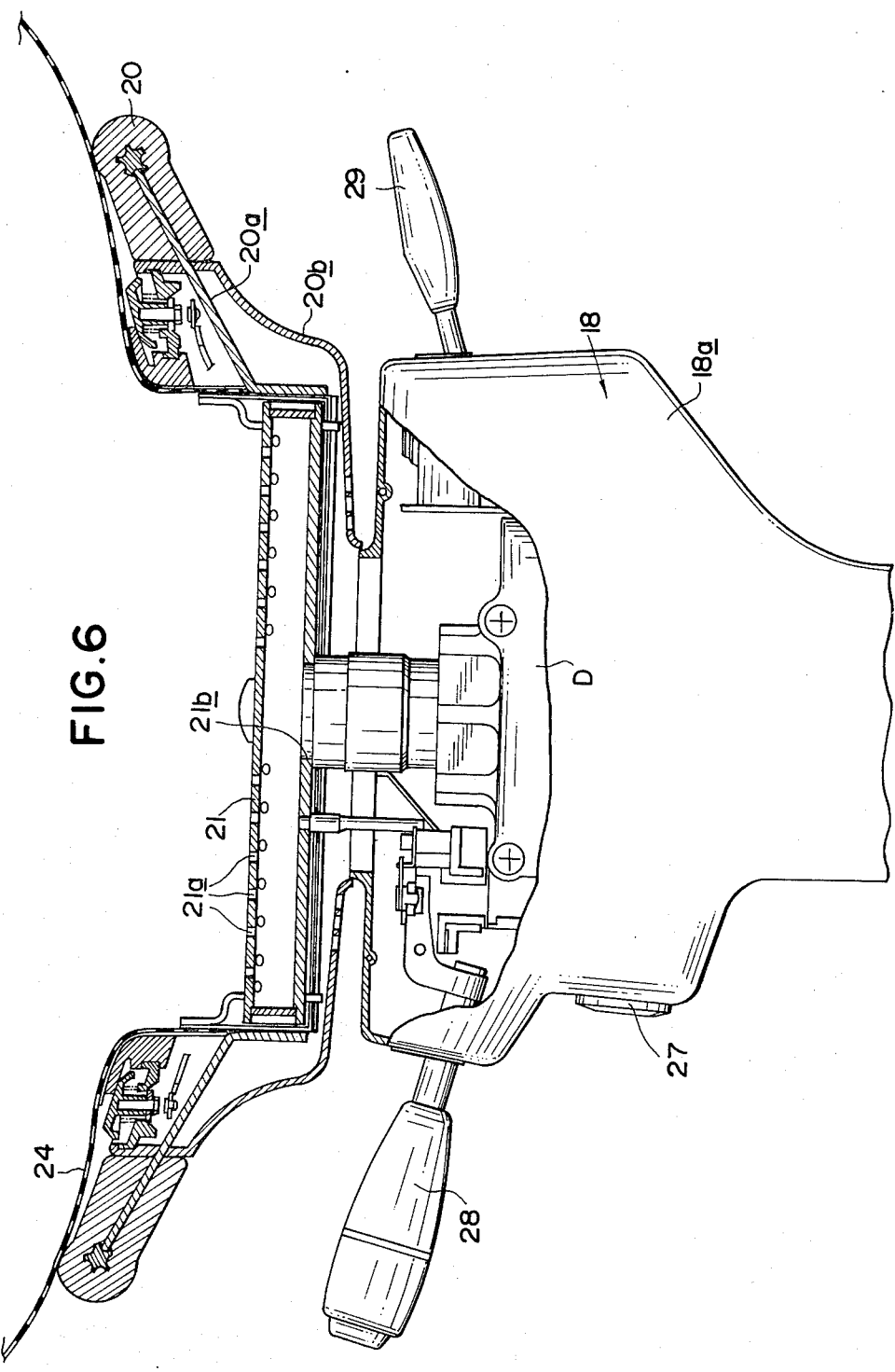

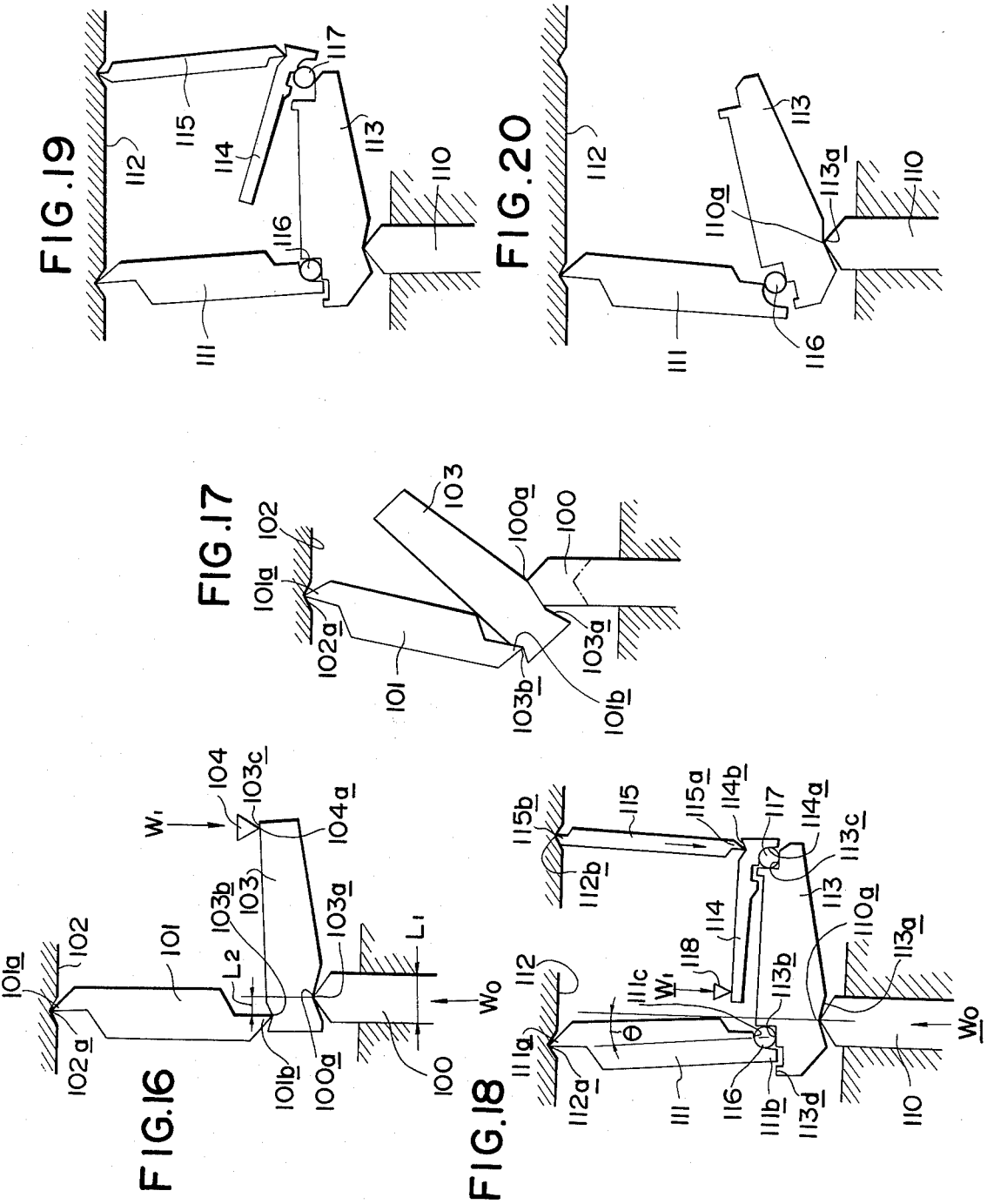

INFLATABLE SAFETY BAG SYSTEM FOR VEHICLES

BACKGROUND OF THE INVENTION

1. Field of the Invention

The present invention relates generally to an inflatable safety bag system for vehicles which provides inflation of a safety bag so as to protect a driver from harm at the time of a vehicle collision.

2. Description of Relevant Art

An inflatable safety bag system for vehicles detects an impact when a vehicle collides and, if such an impact exceeds a predetermined degree, actuates a gas generator so as to inflate a safety bag, thereby lessening the impact on the driver or other passengers for an improved degree of safety for vehicles. Known safety bag systems comprise a safety bag, a gas generator, actuator means, and impact detecting means.

Because safety bag systems require energization of highpressure gas, they generally employ an electrical squib for electrically detecting an impact to detonate an explosive material such as gunpowder, thereby actuating the gas generator. Such utilization of a squib, however, has presented various problems, such as generation of explosion noise. Also, the squib is susceptible to humidity, making it difficult to detonate and it is thus impossible to confirm with certainty the operability of the system after it is assembled.

Further, a safety bag system as described above has attendant therewith a number of shortcomings with regard to the impact detecting device and actuation device thereof.

Because the actuator means employing the squib has the above-described disadvantages, an actuator means of another type has long been desired. The inflatable safety bag system, and the actuator means in particular, should meeet numerous requirements. For exaple, because the actuator means is dispensed with after it is used only once, it should be inexpensive, should be easily mass-produced, and should have a simple structure. Further, the actuator means must be reliably operated within an extremely short period of time.

A known inflatable safety bag system includes a high-pressure gas generator, or more specifically a high-pressure gas container which releases a gas by the actuator means on detection of an impact to supply gas into a safety bag so as to inflate the bag. The high-pressure gas filling the container may possibly leak therefrom over a period of time, and gas temperature and pressure changes depend on ambient conditions. Accordingly, there has been provided in the gas container a small auxiliary container filled with gas under substantially the same pressure as that of the gas in the main gas container, so as to detect a gas leakage by sensing pressure differences between the main gas container and the auxiliary container. However, with the auxiliary container disposed in the main container, the effective volume in the main container is reduced.

There has been proposed the use of a pressure gauge outside the gas container, instead of the use of an auxiliary container. With such pressure gauge, however, it is difficult to determine the difference between a gas pressure change due to a temperature change and a gas pressure change due to a gas leakage.

With the foregoing shortcomings of known systems being considered, the present invention provides an inflatable safety bag system which eliminates the above-discussed problems and deficiencies associated with known systems, and further provides a system which operates reliably at the time of a vehicle collision.

SUMMARY OF THE INVENTION

The present invention provides an inflatable safety bag system comprising an electrical sensor for detecting a collision, and an associated actuator device. The system also includes a mechanical sensor for detecting a collision, an associated actuator device, and a valve opening device for a container of a high-pressure gas for filling a safety bag. The actuator devices are operatively coupled with the valve opening device, and the electrical and mechanical sensors are actuatable independently of each other. The valve opening device is energizable in response to actuation of one of the sensors.

An object of the present invention is to provide an inflatable safety bag system having electrical and mechanical sensor and actuator devices which are independently actuatable. Thus, even if the electrical sensor and actuator device is somehow rendered inoperative due to failure of a power supply or broken wiring, the mechanical sensor and device mechanically detects an impact and inflates the safety bag. In this manner, the inflatable safety bag system can be operated reliably and positively.

Still another object of the invention is to provide an inflatable safety bag system including a mechanical sensor and actuator device which is sufficiently durable to provide stable operation of the safety bag system over a long period of time. The mechanical sensor and actuator device comprises a weight and a link mechanism which is simple in structure and reduced in cost.

A further object of the invention is to provide an inflatable safety bag system including a link mechanism for supporting a cap which seals a gas container against the gas pressure therein. The retainment of the link mechanism assembly depends on electrical and mechanical actuator devices and is breakable when an impact at the time of a vehicle collision is detected, whereupon the pressure on the cover cap is quickly removed to permit the gas to be supplied to the safety bag.

Another object of the invention is to provide an inflatable safety bag system including a gas generator which is actuatable by a mechanical device, rather than a squib. The cap of the gas container, which is heavily loaded, is readily rupturable by a relatively small force, such as one provided by a high-speed solenoid and a sensor weight. Accordingly, the safety bag system has a very reliable operation, so as to ensure the security of the driver of a vehicle at the time of a collision.

Yet another object of the invention is to provide an inflatable safety bag system including a link mechanism formed of mutually engaging pieces. The safety bag system is simple in structure, can be assembled with ease, and can be readily mass-produced. By avoiding use of a squib, the system may be safely assembled, and is effective and safe in operation.

A further object of the invention is to provide a safety bag system having a gas pressure detecting device which comprises a bimetal acted upon, via an outside supporting member, by a load on a sealing plate of a high-pressure gas container, whereby a reduction in gas pressure can be detected by detecting the warping of the bimetal.

Yet another object of the invention is to provide a safety bag system having a pressure detecting device wherein the load output due to the warp in the bimetal is proportional to the detected load due to gas pressure changes, to compensate for changes in the ambient temperature so that only a gas leakage can be detected, while avoiding detection of pressure changes due to temperature changes. Thus, the gas pressure is efficiently and reliably detected.

A still further object of the invention is to provide a safety bag system having a mechanical device for directly and reliably detecting gas pressure to warn of a gas leakage. The pressure detecting device is simple in structure, free from malfunctioning, and inexpensive to manufacture. The pressure detecting device detects gas pressure outside the gas container, so that the device is free from the disadvantages of known gas pressure detecting devices, permitting the gas container and thus the overall safety bag system to be compact in size.

Other objects and advantages of the present invention will become apparent from the following description, when read in conjunction with the accompanying drawings which illustrate preferred embodiments of the present invention by way of example.

BRIEF DESCRIPTION OF THE DRAWINGS

FIG. 3 is a longitudinal cross-sectional view of a steering mechanism.

FIG. 5 is an enlarged plan view, with parts in cross section, of the steering wheel and associated parts.

FIG. 6 is a view similar to FIG. 5, showing an inflated safety bag.

FIG. 16 is a schematic view of a link mechanism.

FIG. 17 is a view of the link mechanism as it is being released.

FIG. 18 is a schematic view of a modified link mechanism.

FIGS. 19 and 20 are views of the link mechanism of FIG. 18 as it is being released.

DETAILED DESCRIPTION OF PREFERRED EMBODIMENTS

Figure 1:
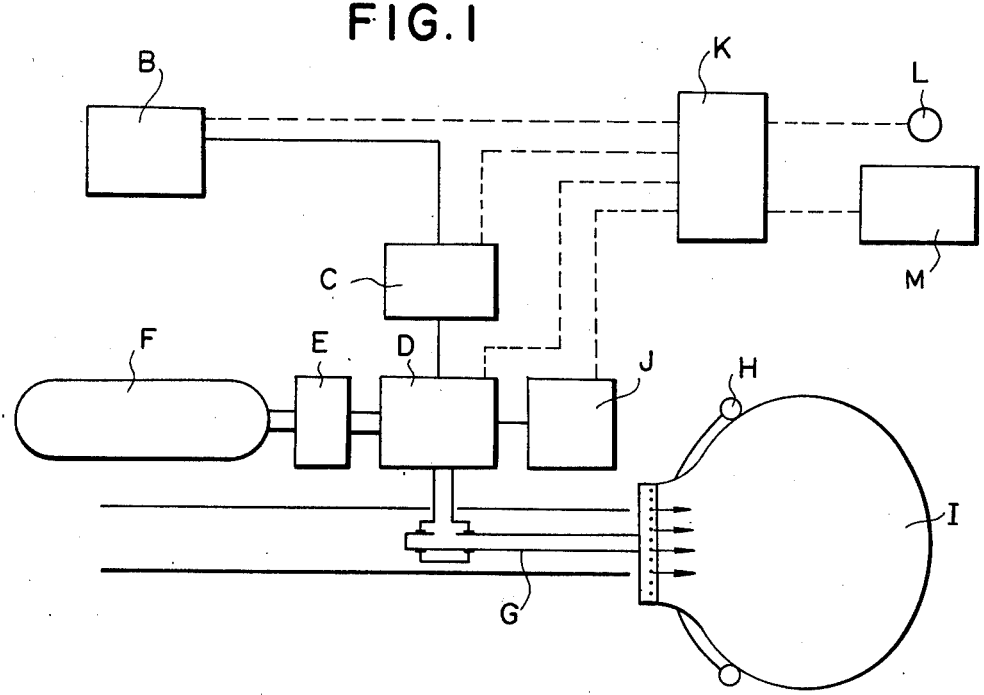
FIG. 1 is a schematic diagram of a safety air bag system.
Figure 4:
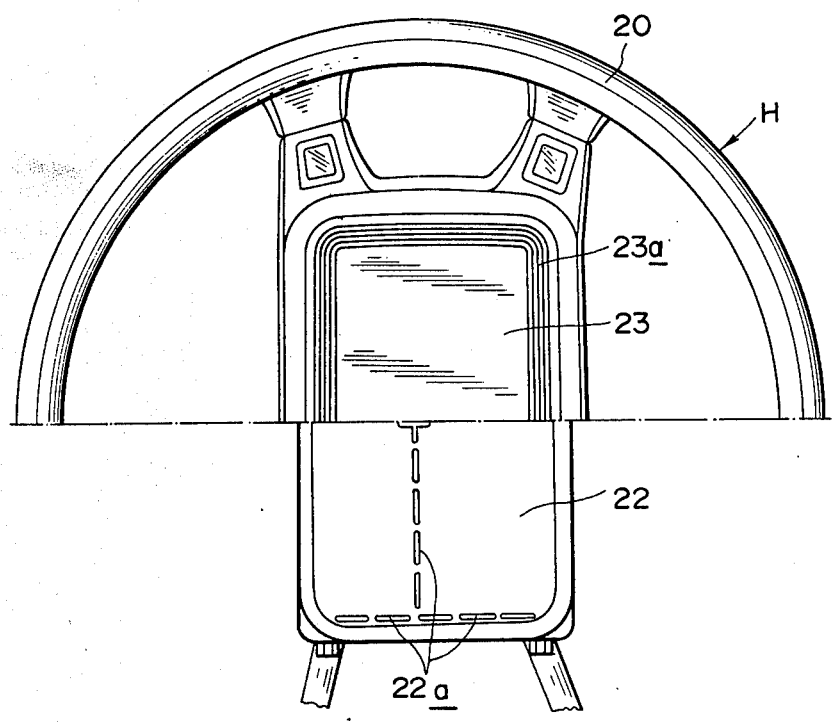
FIG. 4 is a fragmentary view of a steering wheel.
Figure 2:
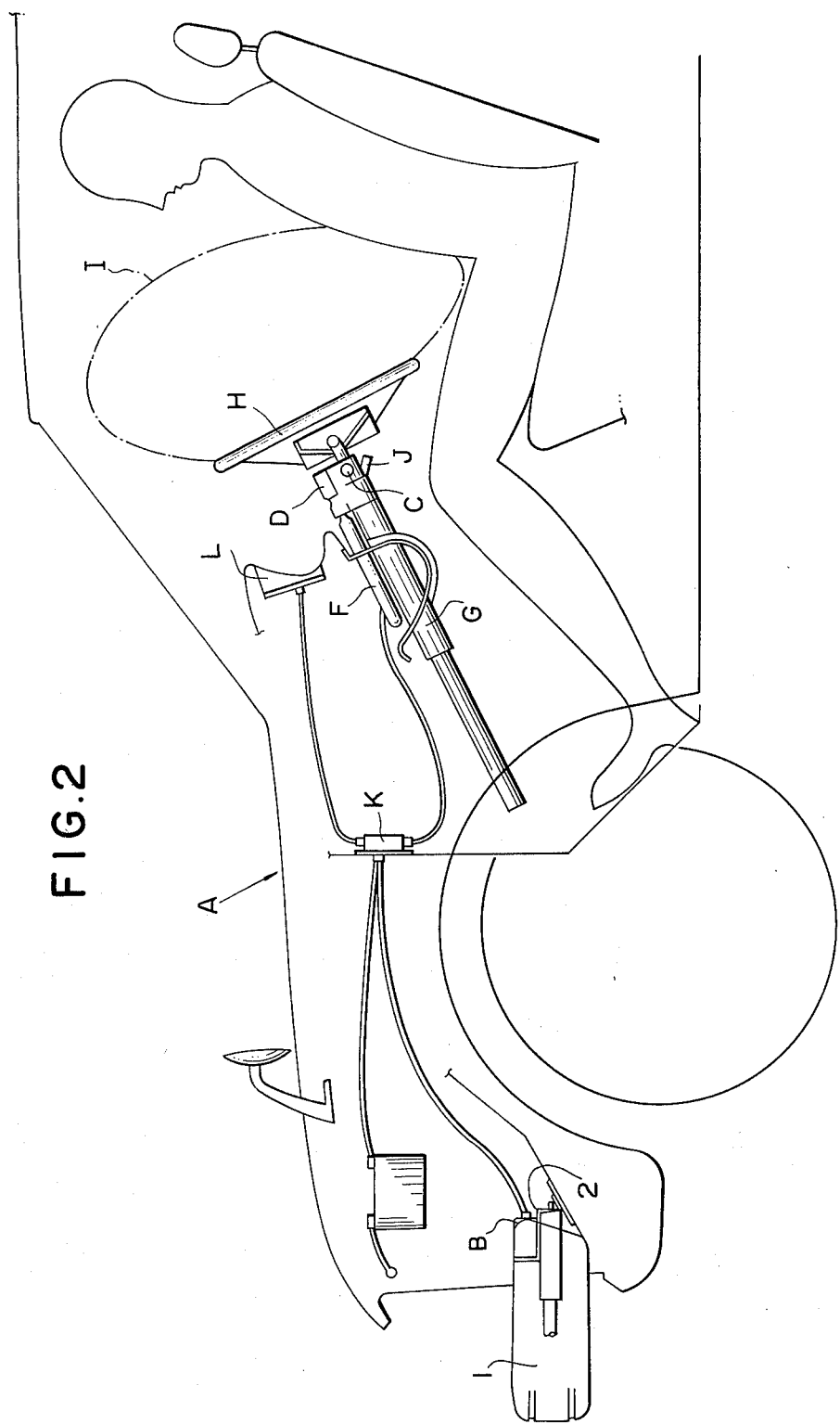
FIG. 2 is a diagrammatic view of a front portion of a vehicle.

With reference to FIGS. 1 and 2, a vehicle A has a front bumper 1 supported by an attachment base 2 on which an electrical sensor B is mounted. When the sensor B detects a predetermined degree of impact, a high-speed solenoid C is energized to operate a mechanical valve opening device D operatively associated therewith. A gas such as nitrogen gas, argon gas, or another inert gas within high-pressure gas containers F is controlled in pressure by a flow control means E and is supplied through a steering column G into a safety bag I attached to a steering wheel H, thereby inflating the safety bag I. The mechanical valve opening device D is also actuatable by a mechanical sensor J, which substitutes for the electrical sensor B when sensor B is inoperative. Thus, there is provided a double-sensor system. The electrical sensor B, high-speed solenoid C, mechanical valve opening device D, and mechanical sensor J are coupled via a failure detector K with a failure indicator L and a failure recorder M. Malfunction of these components is detected by the failure detector K. When a failure or erroneous operation occurs, such fact is indicated on the failure indicator L to warn a driver. If the driver ignores the warning, or a collision occurs after gas pressure has dropped, such fact is recorded by the failure recorder M.

Figure 8:
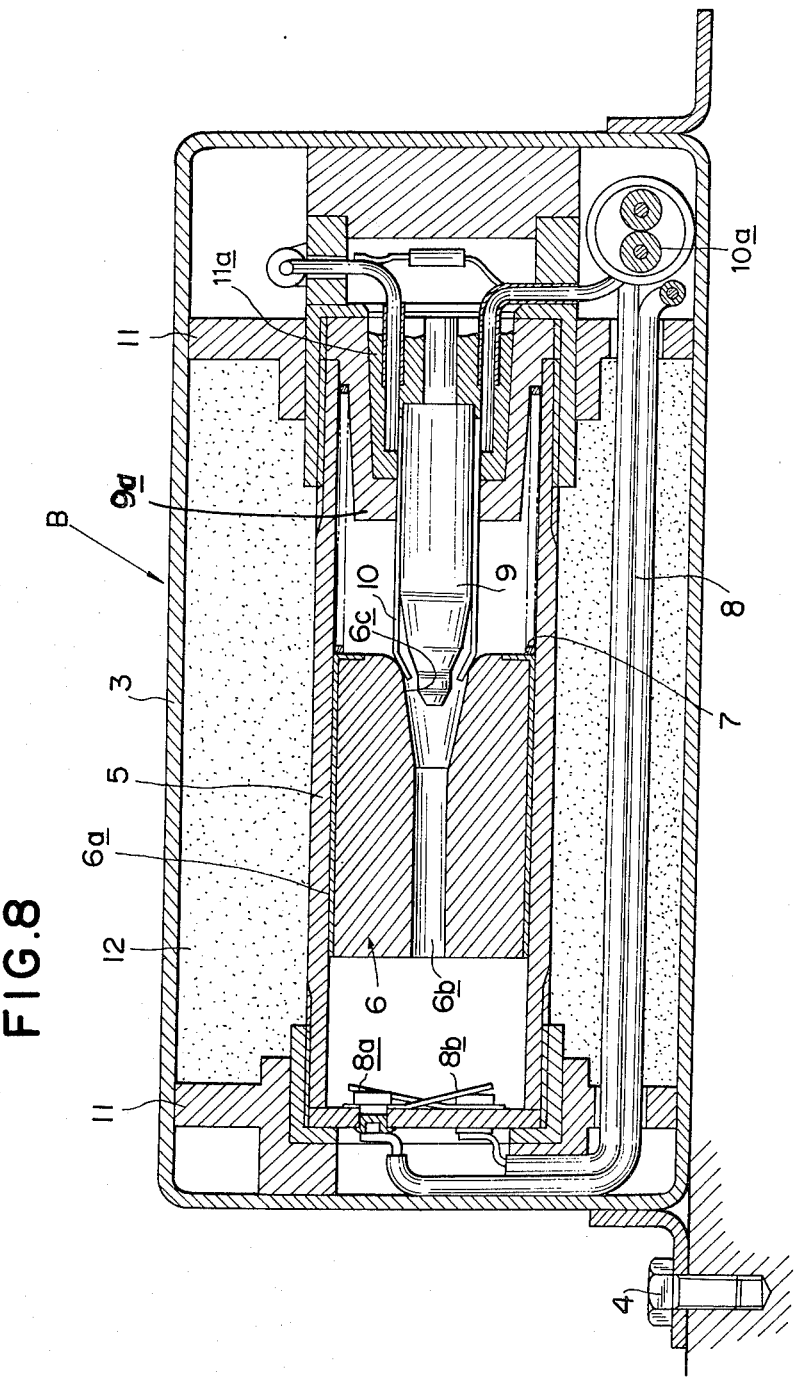
FIG. 8 is a longitudinal cross-sectional view of an electrical sensor.

The structural details of the electrical sensor B mounted in the front portion of the vehicle are shown in FIG. 8, the right-hand direction as viewed in FIG. 8 being the forward direction of the vehicle. The sensor B has a housing 3 attached by a bolt 4 to the front portion of the vehicle. A cylinder 5 is disposed in housing 3 and a weight 6 in the form of a piston is slidably fitted therein. The weight 6 is made of metal alloy and is insulated by a peripheral coating 6a of a synthetic resin, such as Teflon, which itself has a lubricative property. The weight 6 is urged by a spring 7 under compression into contact with the rear end (the left-hand end in the drawing), the weight 6 being normally held against contacts 8a, 8b on the rear end for detecting seating of weight 6 thereon. Weight 6 has an axial hole 6b having a tapered portion 6c. A guide member 9 is disposed forwardly of weight 6. The guide member 9 is supported at its base by a holder 9a, and is provided on its circumference with a plurality of prong-shaped contacts 10 angularly spaced from each other. The contacts 10 are connected via a cord 10a to the high-speed solenoid C, the details of which will be described hereinbelow. The seating detection contacts 8a, 8b are connected via cords 8 to the failure detector K. Between cylinder 5 and housing 3 is disposed an insulator holder 11 and a filling material 12 such as of urethane foam. FIG. 8 shows the position of the parts in detecting a collision, wherein the weight 6 in cylinder 5 is advanced against the force of spring 7 to close contacts 10, whereupon the signal is transmitted via the cord 10a to the solenoid C, thereby operating the mechanical valve actuating device D.

FIGS. 3 through 7 illustrate a steering wheel and associated parts. The steering column G extends obliquely downwardly and forwardly, and is attached to an instrument panel 13 disposed in a front portion of the vehicle compartment. The steering column G has a tubular body 14 formed as a shock absorber by a movable member 14a and a fixed member 14b having a distal end supported by an attachment bracket 15. A steering shaft 16 is rotatably supported by a bearing 17 in tubular body 14. The tubular body 14 is peripherally covered by a separable cover 18 having an upper portion 18a and a lower portion 18b, and tubular body 14 carries thereon bodies 19 of the high-pressure gas containers F, which are covered by the upper cover portion 18a. The shaft 16 has a hollow upper portion 16a proximal to the steering wheel H. An inner space 16c of the upper portion 16a communicates with the interior of the tubular body 14 through a plurality of peripheral apertures 16b. The upper portion 16a is connected to steering wheel H for co-rotation therewith. The steering wheel H includes a wheel ring 20, a bracket 20a connected to the upper shaft portion 16a, and a cover 20b attached so as to be connected at its end to an upper end of cover 18. The upper end 16a of shaft 16 is provided with a transverse elongated nozzle member 21 having a plurality of nozzle holes 21a opening upwardly, and a central hole 21b by which the interior of nozzle member 21 communicates with the space 16c in upper shaft portion 16a.

The steering wheel 14 has a central bag holder cover 22 extending above and around nozzle member 21. A pad 23 is disposed over cover 22. An inflatable member 24 forming bag I is disposed between nozzle member 21 and cover 22, and the peripheral edge thereof is held by the inner periphery of bracket 20a and cover 22. The pad 23 has a weakened portion 23a and cover 22 has weakened portions 22a so that the pad 23 and cover 22 can be easily broken at such weakened portions.

Disposed within member 24 is a check valve 25 (FIG. 7) comprising a partition 25a having openings 25b and a sheet 25c of a flexible material such as cloth or film. When the safety bag is inflated, the sheet 25c is moved away as shown in the left-hand portion of FIG. 7, to open the opening 25b, thereby allowing air to be aspirated from the tubular body 14 with the flow of high-pressure gas into the inflatable member 24 as a supplement to the high-pressure gas. A discharge check valve 26 is provided with a valve 26b biased by a spring 26a to close an opening 26c. As shown in the left-hand portion of FIG. 7, the valve is closed during gas flow into inflatable member 24, and as shown in the right-hand portion of FIG. 7, the check valve 25 is closed under the force applied by the driver against the inflated member 24, whereupon an increased degree of pressure in the inflated member 24 causes opening 26c to open against spring 26a, to thereby permit such increased pressure to escape from inflated member 24. Thus, the driver is prevented from springing back after he has hit the inflated member 24.

In a collision of the vehicle wherein the driver would be subjected to an impact causing him harm, the high-pressure gas container F is opened to allow gas to flow through the apertures 16b and the space 16c in the upper portion 16a of shaft 16 in tubular body 14 into inflatable member 24 via the nozzle holes 21a in nozzle member 21, thereby inflating the bag. At this time, the cover 22 and the pad 23 are quickly broken at the weakened portion 22a, 23a to permit inflation of the bag. Simultaneously, the check valve 25 is opened to introduce air within tubular body 14 into member 24. When the driver hits the inflated member 24, the valve 26 is opened to prevent rebounding of the driver.

Figure 7:
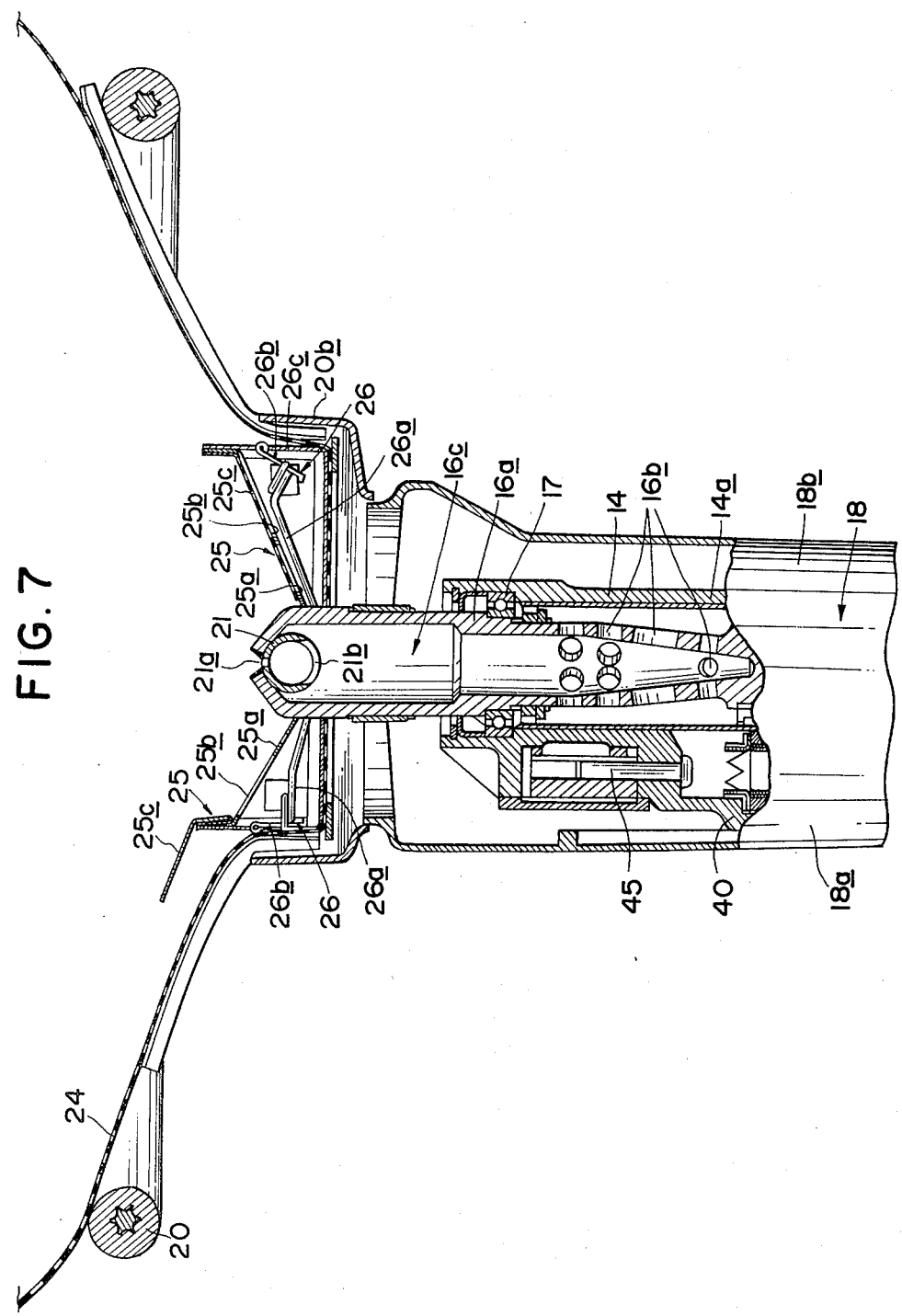
FIG. 7 is a cross-sectional view of the steering wheel and associated parts with the inflated safety bag.

FIGS. 3 and 5 show the bag in a stored position, and FIGS. 6 and 7 show the bag in an inflated position. In FIGS. 5 and 6, there is shown a steering wheel lock and ignition switch 27, a switch 28 for headlights, dimmer lamps and turn signal, and a wiper switch 29.

Figure 9:
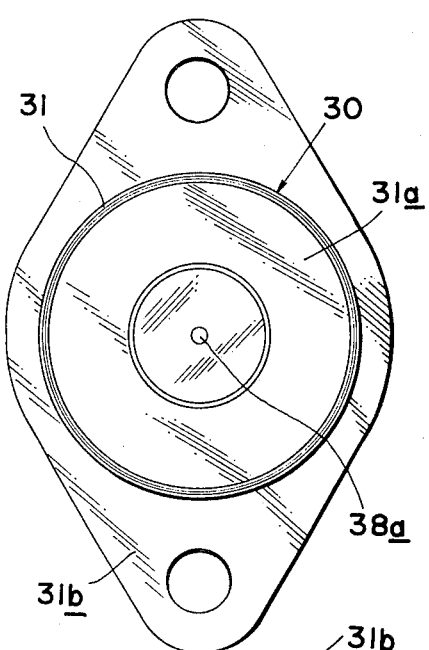
FIG. 9 is an end view of a solenoid.
Figure 11:
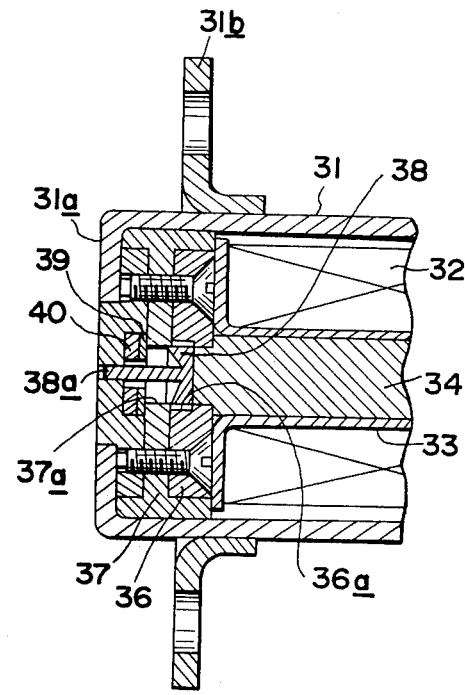
FIG. 11 is a cross-sectional view of a central part of the solenoid as it is actuated.
Figure 10:
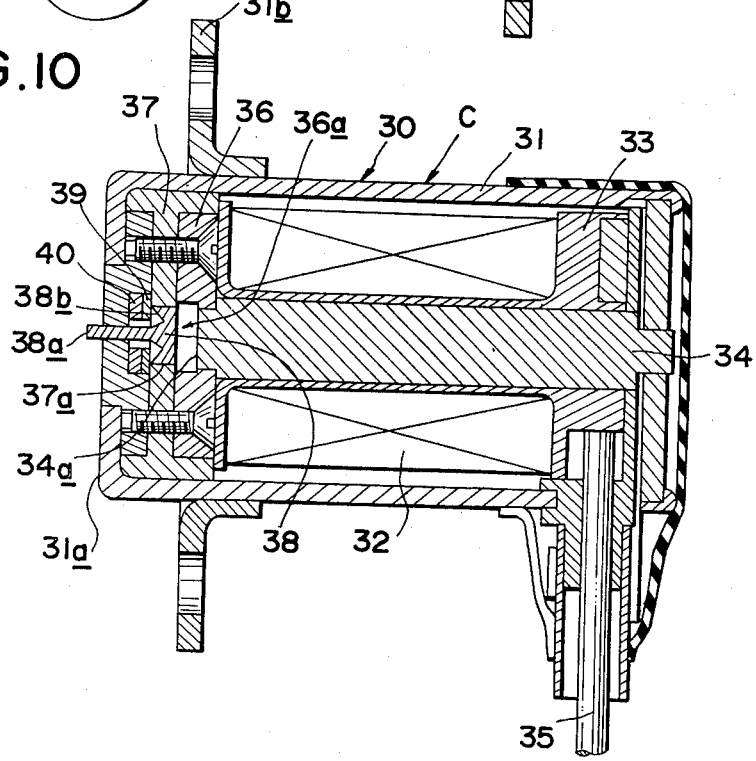
FIG. 10 is a longitudinal cross-sectional view of the solenoid.

FIGS. 9 through 11 illustrate the solenoid C for operating the valve actuating device D for the high-pressure gas container F. The solenoid C comprises a body 30 including a casing 31 in which there is disposed a bobbin 33 around which a coil 32 is wound, and a core 34 extends through bobbin 33. The coil 32 is connected via a lead wire 35 to contacts 10 of the front sensor B. A spacer 36 is disposed in a space 36a at a front end of core 34. A cylinder 37 is disposed forwardly of spacer 36 and is provided with a cylinder bore 37a in which there is slidably disposed a movable disc 38 of magnetic material. The movable disc 38 is provided with a rod 38a projecting outwardly of a front wall 31a of casing 31 for cooperation with a link mechanism of the mechanical valve actuating device. The rod 38a of movable disc 38 has its base portion recessed to provide a conical recess 38b which lightens disc 38 and allows rapid movement thereof when it is attracted by core 34. The disc 38 is normally held away from core 34, i.e., in the position of FIG. 10 for cooperation with the link mechanism, by a magnet 40 with a spacer washer 39 of nonmagnetic material.

When sensor B detects a collision, contacts 10 are closed to energize coil 32, whereupon disc 38 is attracted to an end face 34a of core 34. The rod 38a moves in the right-hand direction to release the link mechanism so as to open the high-pressure gas container F. Such actuated position is illustrated in FIG. 11. In practice, a low-voltage vehicle battery is used to move disc 38 for a stroke of 2 mm per 2 milliseconds. Thus, the solenoid can effect a rapid release operation on a collision detecting signal. The solenoid body 30 is mounted by a bracket 31b.

Figure 12:
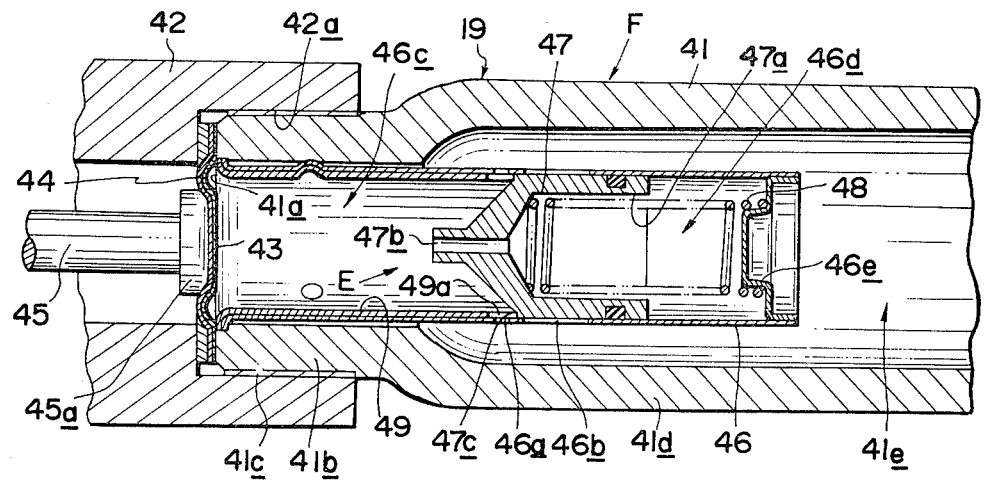
FIG. 12 is a longitudinal cross-sectional view of a flow control device for a gas container.
Figure 13:
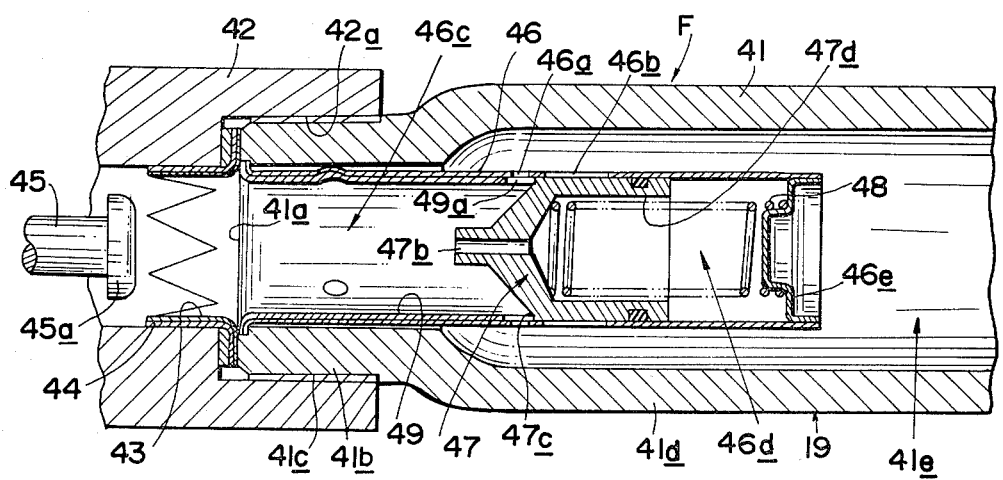
FIGS. 13 and 14 are views similar to FIG. 12, showing the manner in which the flow control device operates.
Figure 14:
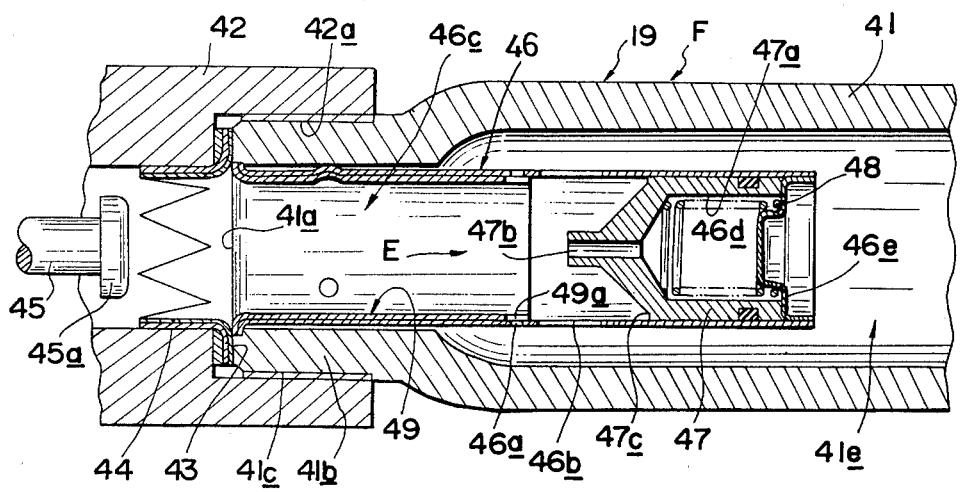

FIGS. 12 through 14 show the flow control means E for the high-pressure gas. In FIG. 14, a body 41 of container 19 has a front end threaded at 42a in a supporting member 42. Between the end of supporting member 42 and the front end of an opening 41a of container body 41 is disposed an easily-rupturable sealing plate 43 and a guide plate 44 disposed radially outwardly of plate 43 and having radial recesses, the guide plate 44 being spread radially when ruptured. The opening 41a of container body 41 is closed by plates 43, 44. The guide plate 44 is contacted in the central portion thereof by an enlarged base portion 45a of a rod 45 having one end thereof supported by the link mechanism. The rod 45 acts against the pressure in container body 41.

The body 41 has a decreased-diameter front end portion 41b including a threaded portion 41c. A tubular guide member 46 is disposed in body 41 and extends axially from the front end portion 41b inwardly. The guide member 46 has the front portion thereof fitted in the small-diameter front end portion 41b, and is provided with a small primary hole 46a at a position disposed in a chamber 41e in a large-diameter portion 41d f body 41, and a large secondary hole 46b disposed rearwardly of hole 46a. A piston 47 is slidably fitted in guide member 46 and has a conical front end. The piston 47 has provided therein a chamber 47a, and a hole 7b which provides communication between chamber 7a and a front chamber 46c of guide member 46 in front of piston 47, i.e., between chamber 46c and a chamber 46d which are bounded by piston 47 in guide member 46. The piston 47 is resiliently urged forwardly by a spring 48 disposed between the rear of piston 47 and a bottom 46e of guide member 46. A tubular member 49 for restricting forward movement of piston 47 is fitted in a front portion of guide member 46. The tubular member 49 has a rear end thereof held in abutment against a front end stop portion 47c of piston 47 for restricting the advance of piston 47. When piston 47 is stopped, a slit 49a in a rear end portion of tubular member 49 is held in registry with primary hole 46a to permit communication between a high-pressure chamber 1e in body 41 and the chamber 46c. Because chamber 6c communicates with chamber 46d through the hole 7b, the chambers 41e, 46c, 46d are kept under the same pressure.

With the above-described arrangement, rod 45 is released in response to a releasing action of the link mechanism, whereby sealing plate 43 and guide plate 44 are ruptured under the gas pressure within body 41. The ruptured position is illustrated in FIG. 13, wherein chamber 46c communicates with inflatable bag member 4, and thus the pressure in chamber 46c is reduced.

To inflate the bag effectively, it is necessary to supply gas under reduced pressure at an earlier stage because the bag has not yet become enlarged and takes only a small amount of gas flow, and to supply gas under high pressure at a later stage. The meeting of such requirement also improves the rate of gas influx into the bag, reduces noise, and prevents hazardous impact of the bag on the driver.

The gas ejected through primary hole 46a from chamber 41e to chamber 46c is directed toward sealing plate 43 by the tapered conical portion of piston 47 which faces primary hole 46a. Piston 47 is then pushed in the right-hand direction under the reactive force. Before sealing plate 43 is ruptured, chambers 46c and 6d are maintained under the same pressure, piston 47 being held against the rear end of tubular body 49 by spring 48 as shown in FIG. 12.

Immediately after sealing plate 43 is ruptured, the pressure in chamber 46d is equal to that in chamber 46c. However, as the pressure in chamber 46c is reduced, the piston 47 is pushed in the left-hand direction by spring 8, and is held against the rear end of tubular body 49. Because chamber 46d communicates with chamber 46c through hole 47b, the difference in pressure between chambers 46d and 46c progressively decreases. When the pressure difference becomes smaller than the reactive force by the gas ejected through primary hole 46a, piston 47 moves in the right-hand direction against spring 48 to the position shown in FIG. 14. At this time, hole 46b opens to supply a large amount of gas into the bag. Accordingly, the amount of gas flowing in at an earlier stage is relatively small, and at a later stage is large with the bag being rapidly inflated.

Figure 15:
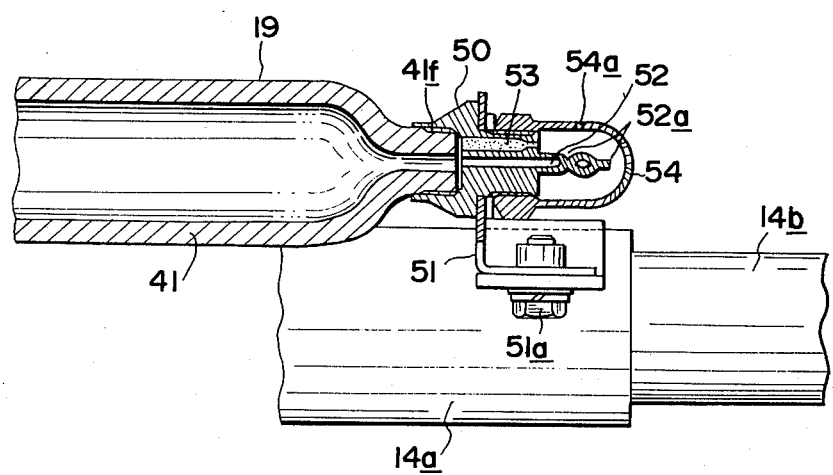
FIG. 15 is a longitudinal cross-sectional view of an end portion of the gas container.

FIG. 15 illustrates a rear end of high-pressure gas container 19. The container body 41 has a threaded rear end 41f over which an end nut 50 is threaded and is sealed by electric beam welding. The end nut 50 is mounted on a bracket 51 which is in turn mounted on tubular body 14 by a bolt 51a. Because the steering column is of the energy-absorbing type in the illustrated embodiment, the bracket 51 is attached to movable member 14a. The end nut 50 has a pipe 52 extending therefrom for filling gas therethrough, the pipe 52 being pressed at 52a and sealed by spot-welding after filling of the gas. The end nut 50 also has a melting plug 53 which is meltable during a fire to allow the pressure in container 19 to escape therefrom. The escaped pressure is discharged through a small aperture 54a in a cap nut 54 threaded over end nut 50.

The mechanical valve actuating device is energizable by the above-described electrical sensor and a mechanical sensor described hereinbelow.

Between high-pressure gas container 19 and the solenoid body 30 is disposed the mechanical valve actuating device comprising a link mechanism for allowing gas to be discharged, and including a mechanical sensor.

Figure 21:
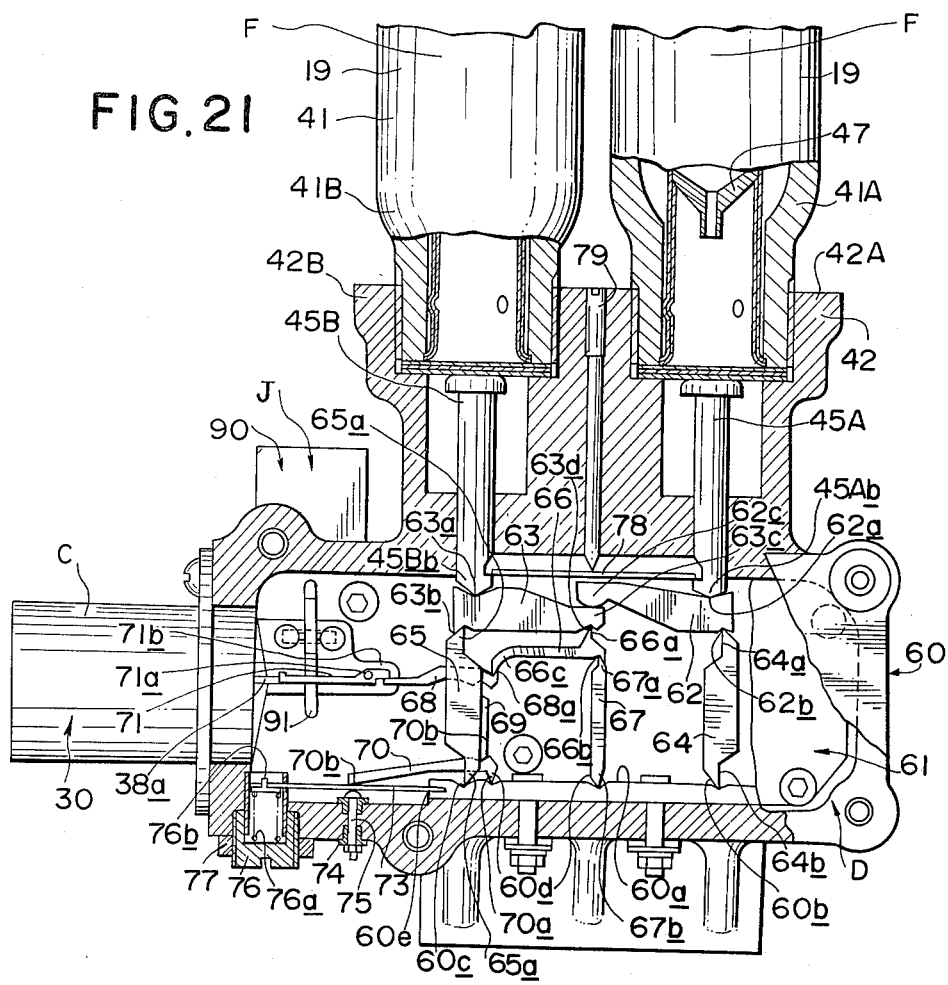
FIG. 21 is a cross-sectional view of a gas valve opening device energizable by the link mechanism.
Figure 22:
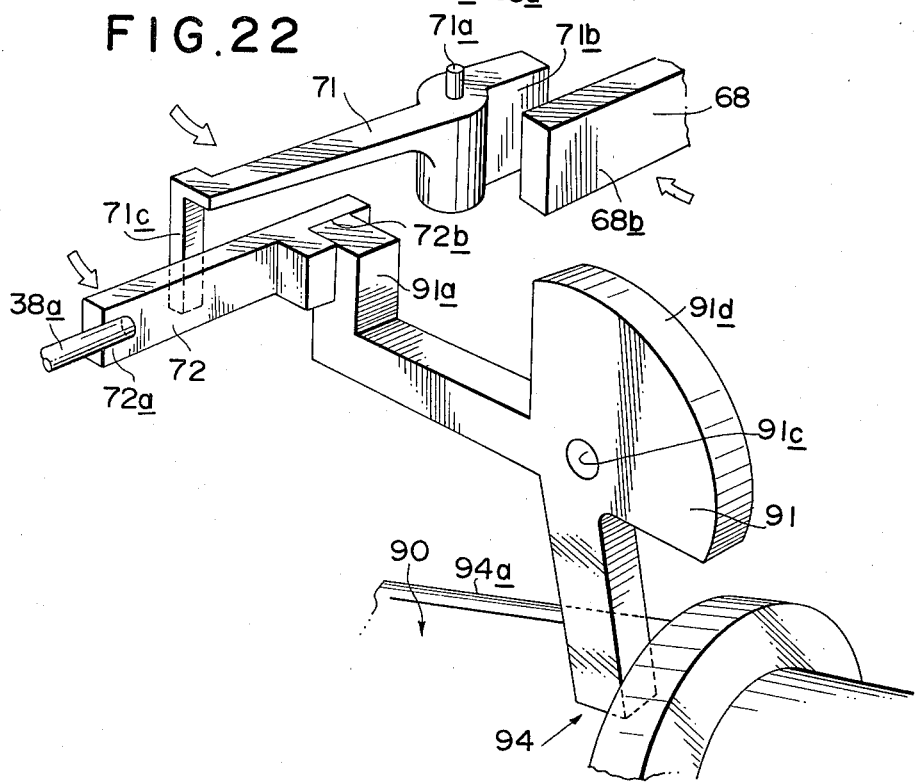
FIG. 22 is an enlarged perspective view of a release mechanism.
Figure 23:
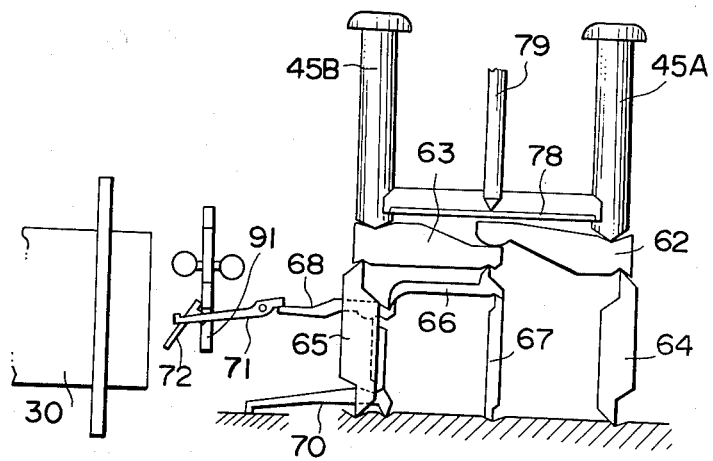
FIGS. 23, 24 and 25 are views which illustrate the manner in which the gas valve actuating device is operated.

The link mechanism including a valve opening device is shown in FIGS. 21 and 22. The basic structure of the link mechanism will be described with reference to FIGS. 16 through 20.

A loading piece 100 is pushed with a force $W_o$ in the direction of the arrow (FIG. 18), loading piece 100 corresponding to rod 45. A supporting piece 101 has a sharpened engaging end 101a supported in a V-shaped notch 102a in a fixed wall 102. Between the pieces 100, 101, there is provided a controlling piece 103 having one end provided with upper and lower V-shaped notches 103a, 103b which are offset from each other. The notch 103a receives a sharpened engaging end 100a of loading piece 100, and the notch 103b receives a sharpened engaging end 101b of supporting piece 101. The controlling piece 103 has the other end 103c thereof supported by a supporting member 104, which is coupled with releasing means formed by a solenoid and mechanical sensor described hereinbelow.

A line along which the load $W_o$ acts at the points 100a, 103a on pieces 100, 103, respectively, is spaced by a distance $L_2$ from the points 101b, 103b. The points 101a, 101b on the piece 101 are located on a line of axis which extends parallel to the line of the load $W_o$. The angle of opening of notch 103a in piece 103 is sufficiently larger than the angle of the tip end of engaging portion 100a of piece 100 to prevent piece 103 from being held in a stable manner on piece 100. The dimension $L_1$ of piece 100 is suitably selected for a required degree of strength.

Assuming that the load $W_o$ is applied to loading piece 100, a counterclockwise moment acts on piece 103 by the load applied to points 100a, 103a spaced the distance $L_2$ from points 101b, 103b. The moment is borne by a force $W_1$ acting on supporting member 104. Thus, a clockwise moment acts on piece 101 at the points 101b, 103b about the points 101a, 102a. With such a link mechanism, the moment acting on supporting member 104 is determined by the load $W_o$ and the extent of offsetting $L_2$, the piece 103 acting as a lever on the fulcrum at supporting member 104. The smaller the distance $L_2$, the greater the ratio of a length between point 104a and points 101b, 103b to a length between points 100a, 103a and points 101b, 103b, and the smaller the load acting on point 104a. Accordingly, a large load $W_o$ can be borne by a small load $W_1$.

When the force $W_1$ is released, piece 103 is turned counterclockwise about points 100a, 103a, whereupon piece 101 is turned clockwise about point 101a. The piece 101 is turned at a greater speed than the speed at which piece 100 moves upwardly, resulting in early disengagement between pieces 100, 103. The pieces 103, 101 do not interfere with advancement of piece 100 thereafter. The released position is shown in FIG. 17.

The link mechanism described above is a single-action mechanism. However, a link mechanism of multiple actions can produce a sufficient load ratio. Although the load ratio in the latter mechanism is commensurate with multiple link action ratios, the force required to release the mechanism is proportional to the number of link actions.

FIGS. 18 through 20 show a modified link mechanism having roller fulcrums to increase the speed at which the link mechanism is released.

A loading piece 110 has an end engaging portion 110a engaging in an engaging notch 113a in one end of a controlling piece 113. The piece 113 has an engaging notch 113b. A supporting piece 111 has an engaging portion 111b including a recess 111c. A roller 116 is disposed in notch 113b and recess 111c. The piece 111 has another engaging portion 111a received in an engaging notch 112a in a wall 112. The controlling piece 113 is provided at the other end thereof with an engaging notch 113c. A second controlling piece 114 is provided at one end thereof with an engaging notch 114a facing engaging notch 113c. A roller 117 is disposed in notches 113c, 114a. The second controlling piece 114 has another engaging notch 114b disposed upwardly of engaging notch 114a, the notch 114b receiving an engaging portion 115a at one end of a second supporting piece 115. The second supporting piece 115 has at the other end thereof an engaging portion 115b received in another engaging notch 112b in wall 112. The second controlling piece 114 has the other end thereof borne by a supporting member 118.

By selecting a suitable degree for the angle $\theta$ between a line of axis through a center of roller 116 and a contact point of roller 116 with piece 111 and a line along which a load $W_o$ acts, the lower end of piece 111 or roller 116 is urged toward the right in the drawings, with a force obtained by multiplying the force acting along the axis of the piece by sin $\theta$. The fulcrums 111c, 116 are offset from the fulcrums 113a, 110a. The other end of piece 113 is similarly offset, and is supported by the second controlling piece 114 through roller 117 and piece 115. With such a double-action arrangement, a load on the supporting member 118 (which may comprise another link piece) supporting the piece 114 is reduced, resulting in a reduced amount of supporting force $W_1$. The piece 113 has a projection 113d for preventing shifting movement of the lower end 111b of piece 111 to the left when the force, imposed at the time of a lateral collision of the vehicle which does not require safety bag inflation, overcomes the above-described supporting force.

When piece 114 is disengaged from supporting member 118, piece 114 is turned clockwise about roller 117, and piece 115 is turned counterclockwise, resulting in disengagement at the other end of piece 113 (FIG. 19). The other end of piece 113 then becomes free to move and is turned counterclockwise about 110a, and piece 111 is turned clockwise, whereupon piece 110 is free to move upwardly (FIG. 20). The above movements are effected smoothly and quickly because rollers 116, 117 are employed at the fulcrums. Because roller 116 is disengaged before disengagement of the fulcrum 110a, 113a, the piece 110 can move rapidly upwardly. Thus, the speed at which the link mechanism is actuated is increased.

As mentioned above, the link mechanism can be released more quickly by rolling movement of the rollers, and can be composed of multiple actions.

The mechanical valve actuating device employing the link mechanism described hereinabove will be specifically described with reference to FIG. 21 and other related figures.

A housing 60 has the supporting member 42 to which there are threadedly attached a pair of parallel gas container bodies 41A, 41B mounted respectively on a pair of supports 42A, 42B of supporting member 42. A pair of parallel rods 45A, 45B have distal ends which project into an upper portion of a chamber 61 in housing 60. The other ends of rods 45A, 45B support sealing plate 43 and guide plate 44 to close the openings of bodies 41A, 41B against the pressure of gas. FIG. 21 shows the valve-closed position of the parts ready for operation.

The rods 45A, 45B have respective pointed engaging projections 45Ab, 45Bb, each constituting the loading piece as described above. The engaging projections 45Ab, 45Bb engage in and are supported by engaging notches 62a, 63a, respectively, formed in one end of a pair of separate pieces 62, 63. The pieces 62, 63 have on the same end a pair of respective engaging notches 62b, 63b. A pair of pieces 64, 65 are supported respectively between the notch 62b and an engaging notch 60b in the bottom 60a of the housing 60 and between the notch 63b and an engaging notch 60c in the housing bottom 60a. The pieces 64, 65 have respective engaging projections 64a, 65a received in the engaging notches 62b, 63b in the pieces 62, 63, and respective engaging projections 64b, 65b received in the engaging notches 60b, 60c in the housing bottom. The fulcrums on the rods 45A, 45B are offset from the fulcrums on the pieces 64, 65. The piece 62 is given a moment in the counterclockwise direction, and the piece 63 is given a moment in the clockwise direction, with the result that the overlapped ends 62c, 63c of pieces 62, 63 are urged to move downwardly. The lower piece 63 has provided in its one end 63c a downwardly opening engaging notch 63d in which there is engaged an engaging projection 66a on one end of an intermediate piece 66. A piece 67 has provided on one end thereof an engaging projection 67a received in an engaging notch 66b formed in offset relation to the projection 66a, and on the other end an engaging projection 67b received in an engaging notch 60d in the bottom 60a of housing 60. The loads on pieces 62, 63 are borne by piece 67.

The engaging projection 66c at the other end of piece 66 engages in and is supported by an engaging notch 68a in one end of a final piece 68. The final piece 68 has an offset engaging notch held in engagement with an engaging projection in an end of a vertical transmitting piece 69. An engaging projection at the other end of piece 69 engages in an engaging notch 70b in a sensor piece 70 having on one end thereof a projection 70a engaging in an engaging notch 60d in housing bottom 60a, the engaging projection of piece 69 being offset from projection 70a.

With this arrangement, the piece 66 tends to turn counter-clockwise, the final piece 68 tends to turn clockwise, and the sensor piece 70 tends to turn counterclockwise through piece 69. The loads applied on rods 45A, 45B by the high-pressure gas in container bodies 41A, 41B are synthesized and supported by a group of pieces, and are progressively reduced by the offsetting of the engaging portions and leverage of the pieces. A force tending to turn the final piece 68 clockwise is reduced to a small degree by the leverage.

The other end 68b of the final piece 68 is borne by a collision detecting and drive mechanism shown in FIG. 22. More specifically, the loading end 68b tending to move in the direction of the arrow is supported by an end 71b of an arm 71 pivotally supported by a pin 71a. The other end 71c of arm 71 is bent downwardly and tends to turn in the direction of the arrow, which is opposite to the direction in which final piece 68 tends to turn, the other end 71c being borne by a restriction arm 72. The restriction arm 72 has one end 72a which is borne by the rod 38a of the solenoid disc 38 against being turned in the direction of the arrow. The other end of piece 72 has an engaging projection 72b held in engagement with an end 91a of an L-shaped arm 91 of a mechanical sensor 90.

Figure 26:
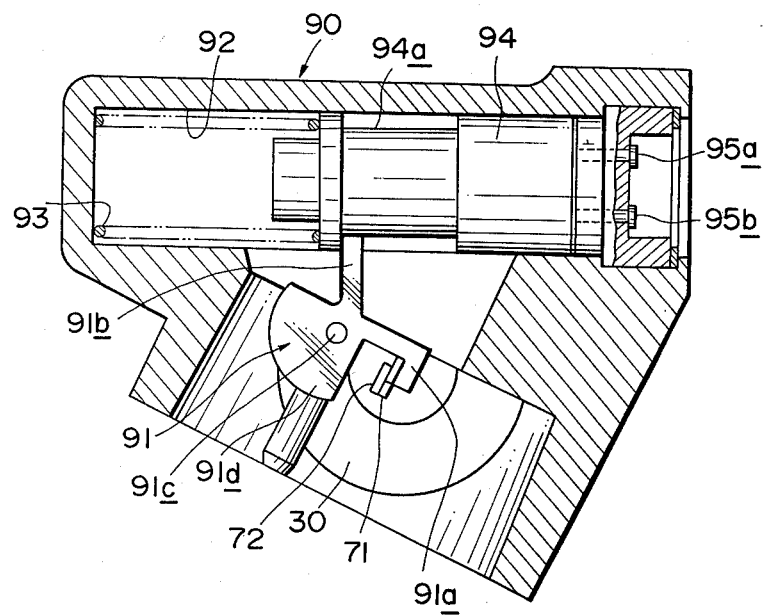
FIG. 26 is a longitudinal cross-sectional view of a mechanical sensor.
Figure 27:
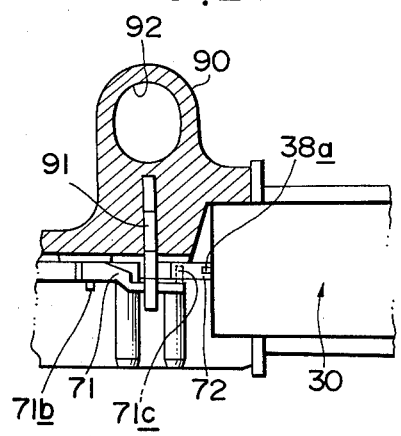
FIG. 27 is a view of a part operatively connecting a solenoid releasing mechanism and the mechanical sensor.

The mechanical sensor 90 is illustrated in FIG. 26, and is associated in a horizontal position with the mechanical valve actuating device. The sensor 90 has a cylinder 92 in which is disposed a piston 94 biased by a spring 93 to be normally retracted into a seated position, which is sensed by contacts 95a, 95b rendered conductive. The piston 94 has a circumferential groove 94a in which there is engaged the other end 91b of the L-shaped arm 91 having a weight 91d. Under an impact when the vehicle collides and the safety bag is to be inflated, piston 94 is advanced against spring 93 until the shoulder of groove 94a engages end 91b of arm 91 and angularly moves arm 91 about pin 91c, whereupon end 91a is disengaged from piece 72 to allow the valve actuating device to operate. The mechanical sensor 90 is actuated simultaneously with the retracting movement of rod 38a of the solenoid 30 in response to detection of a collision by the electrical sensor B. Therefore, even if electrical sensor B fails, the mechanical sensor 90 releases the piece 72 to allow the link mechanism to be released and the gas containers to open.

Figure 30:
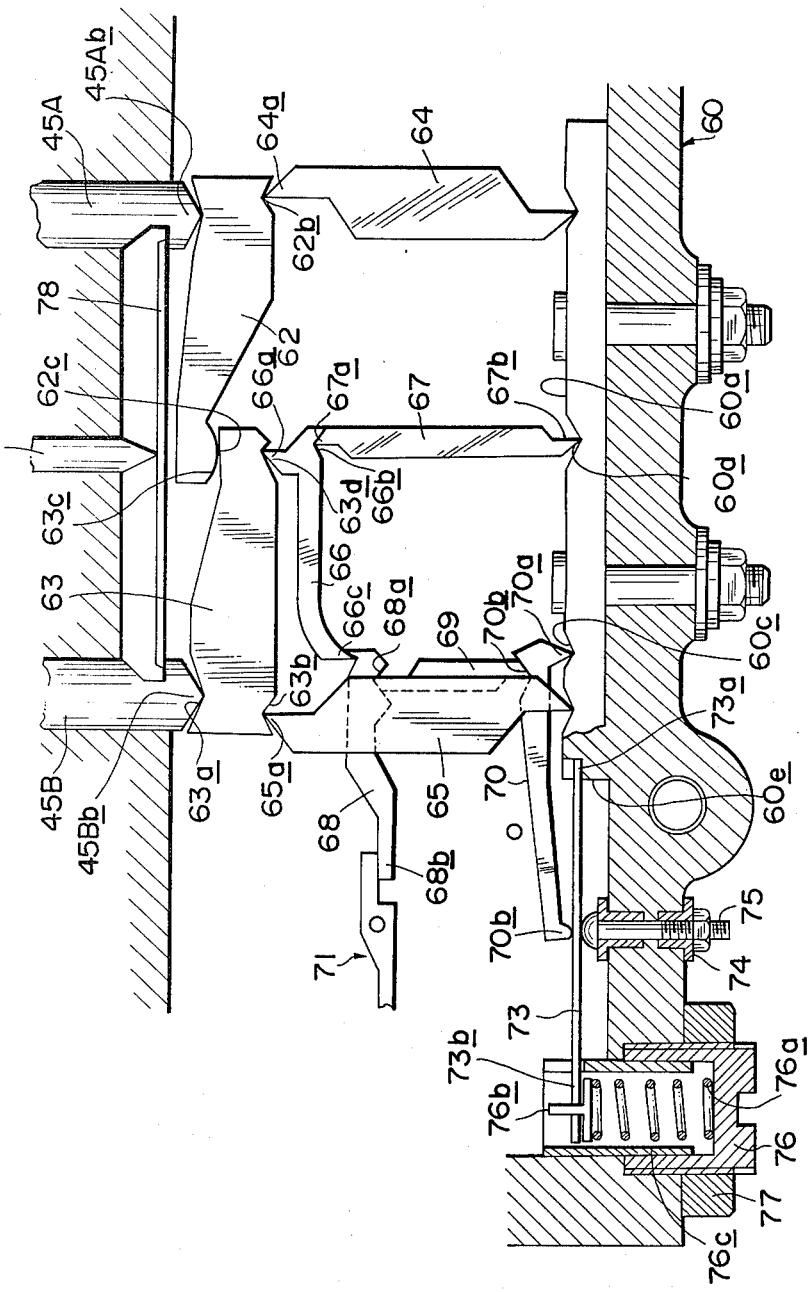
FIG. 30 is an enlarged elevational view of a pressure detecting mechanism.

The sensor piece 70 of FIGS. 21 and 30 has an end 70b urged to turn counterclockwise or move downwardly under a force of part of the gas pressure in the gas container bodies 41A, 41B acting through pieces 66, 68, 69. The end 70b of sensor piece 70 is supported by a bimetal 73 therebelow, there being an electrode 74 disposed beneath bimetal 73 and having a contact 75. The bimetal 73 has one end 73a thereof connected to a portion 60e of housing bottom 60a, and the other end 73b thereof engaged by a sensitivity adjusting screw 76. The screw 76 has disposed therein a sleeve 76c containing a spring 76a therein. The end 73b of bimetal 73 is engaged by an engaging piece 76b resiliently biased by spring 76a, and is urged to move upwardly thereby. The screw 76 is retained in position by a locknut 77.

A portion of the gas pressure from the gas containers acts on bimetal 73 via the end 70b of piece 70, thereby pressing spring 76a downwardly. The bimetal 73 is thus held in contact with contact 75 to close the circuit formed by electrode 74, contact 75, bimetal 73, and housing 60, so as to indicate that the gas pressure is normal.

Figure 31:
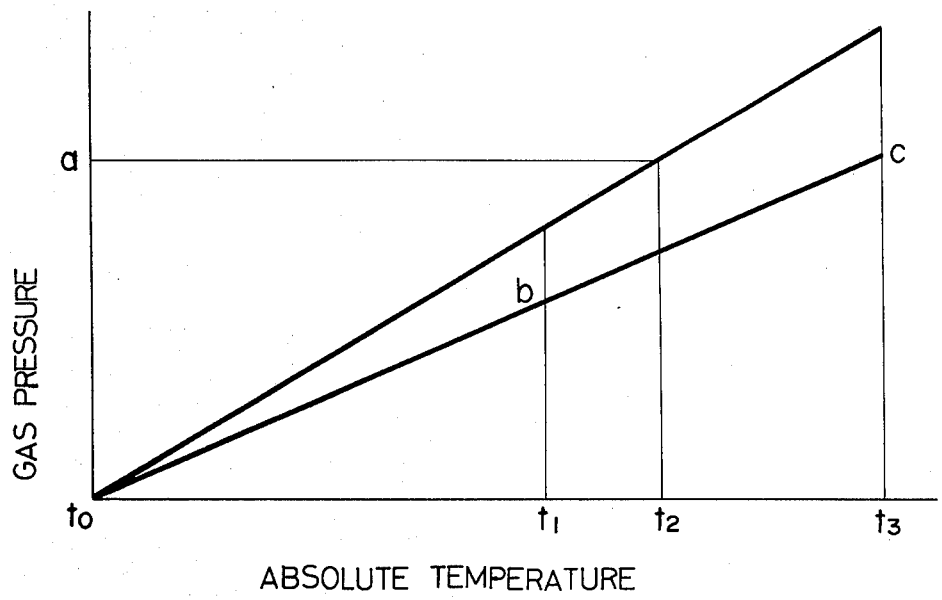
FIG. 31 is a graph explanatory of the pressure detecting operation.

The gas pressure in the gas containers is proportional to the absolute temperature. With reference to FIG. 31, the gas pressure is indicated by the vertical axis, the absolute temperature is indicated by the horizontal axis, and the point $t_o$ represents absolute zero. The temperature at which the gas is filled in the containers is indicated by $t_2$, the pressure of the filled gas is indicated by a, and the temperature range for normal usage of the device is from $t_1$ to $t_3$. The limits for indicating the normal gas pressure are on a line starting from $t_o$. A load developing in the bimetal 73, or a reactive force produced by the warp of the bimetal 73 due to temperature differences is required to be proportional to the points b and c. The point of contact of the bimetal 73 may be considered to be substantially fixed because it moves only a stroke necessary for making and breaking the circuit including contact 75. In order for bimetal 73 to produce the load output proportional to the points b and c, it is necessary for the bimetal warp to be proportional to the limit points b and c. The free shape of the bimetal 73 at the temperature $t_o$ must conform with the shape thereof when it is attached. In other words, the bimetal 73 must be changed in shape in proportion or substantial proportion to the absolute temperature as is proportional to the gas pressure. Because the warping of bimetal 73 due to the temperature change is determined by the materials of which the bimetal is made, and is not freely governable, the coil spring 76a of good responsiveness and stability is employed to meet the requirements. Of course, spring 76a may be dispensed with when a suitable bimetal having desired warping and resiliency is used.

When the gas in the containers is leaked to allow the gas pressure to drop, the load acting on the sensor piece 70 via the rods 45A, 45B and the link mechanism is reduced to the point where the load is overcome by bimetal 73 and spring 76a, or the gas pressure is dropped below the lower limit, bimetal 73 is bent out of contact with contact 75, thereby indicating the gas leakage. On one hand, bimetal 73 warps due to temperature changes to cause the forces from spring 76a and the warping to act on sensor piece 70. On the other hand, sensor piece 70 is subjected to a load depending on differences in the gas pressure due to temperature changes, whereby bimetal 73 has warping characteristics which follow the differences in the gas pressure and compensate for them so as to effect detecting operation in response to ambient temperature.

Accordingly, the gas pressure can be detected because the differences in gas pressure due to temperature changes can be compensated for. With such direct detection of the gas pressure outside the gas containers, the detection is accurate, the containers are relatively small, and the structure is simple, effective and compact with the use of the valve actuating mechanism.

FIGS. 21 and 30 illustrate a leaf spring 78 for loading rods 45A, 45B against breakage of the link mechanism during the filling of the gas in the gas containers, the loading by spring 78 being adjustable by an adjusting screw 79.

The valve opening operation will now be described hereinbelow.

The final piece 68 is subjected to the gas pressure in gas containers 41A, 41B as it is reduced through rods 45A, 45B and the link mechanism having pieces 62, 63, 66, the reduced load being borne by end 68b in contact with end 71b of arm 71, the restriction piece 72 in contact with end 71c of arm 71, the restriction piece 72 in engagement with solenoid rod 38a and with end 91a of arm 91 of mechanical sensor 90.

When the vehicle collides and the driver is likely to be injured, the electrical sensor B is actuated to energize the solenoid 30, whereupon movable disc 38 is attracted to core 34, thereby causing rod 38a to retract, as shown in FIG. 11. Thus, the restriction piece 72 is released to allow arm 71 to turn about pin 71a in a direction to permit final piece 68 to turn.

Figure 24:
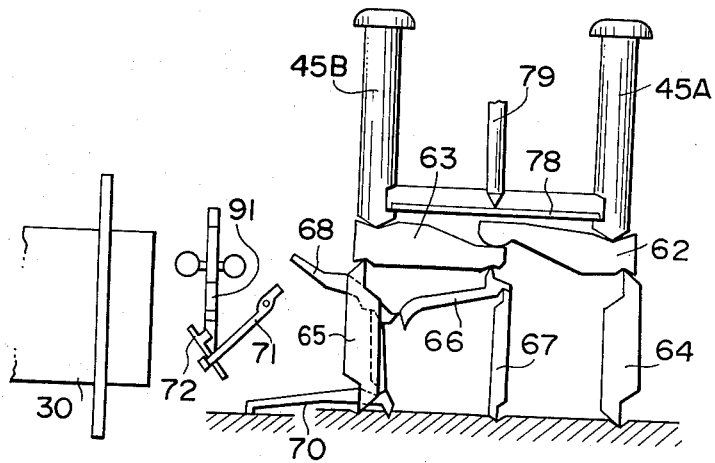
Figure 25:
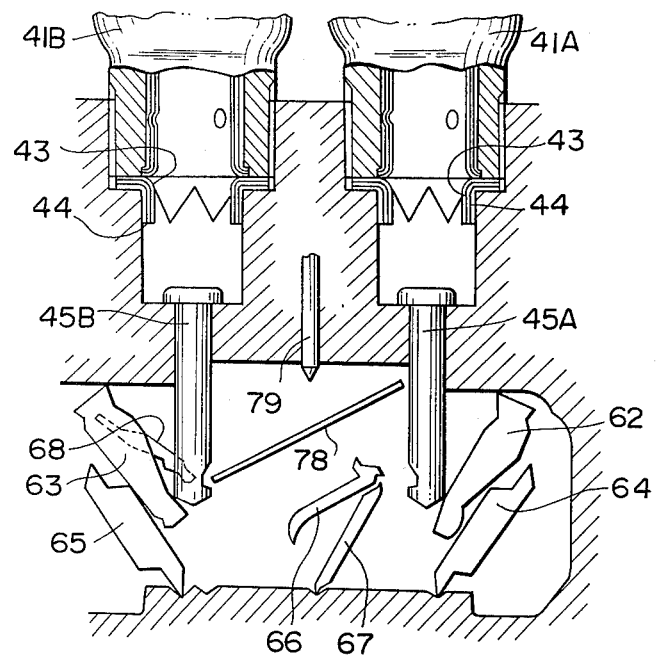

The final piece 68 is then turned clockwise to release the intermediate piece 66 engaged therewith, which is free to turn counterclockwise as shown in FIG. 24. The pieces 62, 63 of which overlapping ends are limited in position by the intermediate piece 66 are allowed to move downwardly, whereupon supporting pieces 64, 65 fall, and pieces 62, 63 drop. At this time, rods 45A, 45B are freely dropped to allow the sealing plates 43 and the guide plates 44 to rupture, whereby the high-pressure gas is supplied in controlled quantity and speed into the safety bag to enable it to be inflated, as illustrated in FIG. 25.

Figure 28:
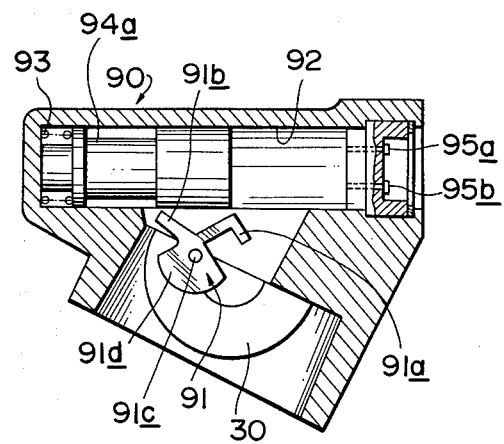
FIG. 28 is a cross-sectional view of the mechanical sensor as it is actuated.
Figure 29:
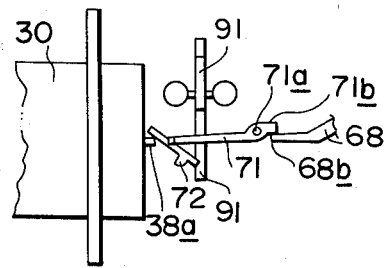
FIG. 29 is a schematic view illustrating the manner in which a releasing operation is carried out by the mechanical sensor.

In response to the collision, the piston 94 of mechanical sensor 90 moves forwardly as shown in FIG. 28 to permit the arm to turn counterclockwise, thereby releasing the engagement of restriction piece 72 by end 91a. When the electrical sensor fails, the rod 38a of the solenoid 30 does not release its engagement with the restriction piece 72. However, piston 94 of mechanical sensor 90 is moved to permit the arm 91 to move as shown in FIG. 28, whereupon piece 72 is released to allow the same releasing operation of the link mechanism as described hereinabove.

Although preferred embodiments of the present invention have been shown and described in detail hereinabove, it should be understood that various changes and modifications may be made therein without departing from the scope of the appended claims. Although the principles of the present invention have been shown as applied to a safety bag system designed for the driver of a vehicle, such principles are equally applicable to a safety bag system designed for passengers other than the driver.

I claim:

1. An inflatable safety bag system for vehicles, comprising:
    an electrical sensor for detecting a vehicle collision; electrical actuator means;
    a mechanical sensor for detecting a vehicle collision; mechanical actuator means;
    a mechanical valve opening device for a high-pressure gas container for filling gas in a safety bag;
    said electrical actuator means and said mechanical actuator means being operatively connected to said mechanical valve opening device, and being constructed to operate independently;
    said mechanical valve opening device being actuatable to open said gas container in response to actuation of one of said electrical actuator means and said mechanical actuator means;
    said electrical actuator means comprising a solenoid energizable by a collision detecting signal from said electrical sensor;
    said solenoid comprising a movable member movable by a core which is energizable by a collision detecting signal from said electrical sensor, for actuating said valve opening device; and
    said movable member comprising a disc-shaped body, a rod projecting centrally from the rear of said body for restricting said valve opening device, and a conical recessed portion at the rear of said body and at the base of said rod.

2. An inflatable safety bag system for vehicles, comprising:
    an electrical sensor for detecting a vehicle collision; electrical actuator means;
    a mechanical sensor for detecting a vehicle collision; mechanical actuator means;
    a mechanical valve opening device for a high-pressure gas container for filling gas in a safety bag;
    said electrical actuator means and said mechanical actuator means being operatively connected to said mechanical valve opening device, and being constructed to operate independently;
    said mechanical valve opening device being actuatable to open said gas container in response to actuation of one of said electrical actuator means and said mechanical actuator means;
    said high-pressure gas container including an opening closed off by a sealing plate supported against gas pressure in said container by a portion of said mechanical valve opening device;
    said gas container including a hollow cylindrical member disposed therein;
    said cylindrical member being provided with a piston slidably disposed therein and resiliently biased in a predetermined position;
    said piston partitioning the interior of said cylindrical member and permitting communication between both sides of said piston; and
    said cylindrical member being provided with a primary opening disposed forwardly of said piston when it is disposed in said predetermined position and providing communication between the interior of said gas container and a chamber forward of said piston and a secondary opening closed by said piston when it is in said predetermined position.

3. An inflatable safety bag system for vehicles, comprising:
    an electrical sensor for detecting a vehicle collision; electrical actuator means;
    a mechanical sensor for detecting a vehicle collision; mechanical actuator means;
    a mechanical valve opening device for a high-pressure gas container for filling gas in a safety bag;
    said electrical actuator means and said mechanical actuator means being operatively connected to said mechanical valve opening device, and being constructed to operate independently;
    said mechanical valve opening device being actuatable to open said gas container in response to actuation of one of said electrical actuator means and said mechanical actuator means; and
    a link mechanism, said link mechanism comprising:
        a controlling piece having one end thereof releasably restricted by said electrical and mechanical actuator means;
        a supporting piece having one end thereof pivotally engaged with a fixed member and the other end thereof engaged with the other end of said controlling piece; and
        a loading piece on which the pressure in said high-pressure gas container acts in the discharging direction, said loading piece having one end thereof engaged with said controlling piece in offset relation to a position at which said controlling piece is engaged by said supporting piece, and said loading piece being shiftable only in a direction substantially perpendicularly to said controlling piece.

4. An inflatable safety bag system according to claim 3, wherein:
    said pieces are engaged with one another in notch-and-projection relation.

5. An inflatable safety bag system according to claim 1, further including:
   a roller disposed between engaging portions of said supporting piece and said controlling piece.

6. An inflatable safety bag system according to claim 1, wherein:
   said controlling piece includes a loaded end supported by a fixed wall via a second supporting piece;
   said link mechanism further comprises a next piece having one end thereof supported between said loaded end of said controlling piece and one end of said second supporting piece;
   the other end of said second supporting piece is engaged in offset relation with said fixed wall; and
   said next piece is limited at the other end thereof by another piece or limiting means.

7. An inflatable safety bag system according to claim 1, wherein:
   said loading piece is provided in a pair movable in the same direction;
   a pair of said controlling pieces are provided;
   each loading piece is engaged and supported by one end of one of said controlling pieces;
   said controlling pieces are supported through supporting pieces on the fixed side; and
   said controlling pieces have the other ends thereof overlapped and limited by a final control piece connected with no releasing means.

8. An inflatable safety bag system according to claim 7, wherein:
   said final control piece is confined by one end of a pivoted arm; and
   said arm has the other end thereof confined by a restriction piece disposed between said actuator means of the solenoid and said actuator means of the mechanical sensor.

9. An inflatable safety bag system for vehicles, comprising:
   an electrical sensor for detecting a vehicle collision;
   electrical actuator means;
   a mechanical sensor for detecting a vehicle collision;
   mechanical actuator means;
   a mechanical valve opening device for a high-pressure gas container for filling gas in a safety bag;
   said electrical actuator means and said mechanical actuator means being operatively connected to said mechanical valve opening device, and being constructed to operate independently;
   said mechanical valve opening device being actuatable to open said gas container in response to actuation of one of said electrical actuator means and said mechanical actuator means; and
   resilient supporting means including a bimetal and supporting through a piece of a link mechanism a load applied on the sealing plate closing the opening of said high-pressure gas container, so that displacement of said resilient supporting means is sensed to detect a reduction in the gas pressure in said gas container.

10. An inflatable safety bag system according to claim 9, wherein:
    said bimetal is displaceable substantially in proportion to the absolute temperature; and
    detecting switch means is provided which is actuatable in response to the displacement of said bimetal due to a reduction in the gas pressure.

11. An inflatable safety bag system according to claim 3, wherein:
    said electrical actuator means comprises a solenoid energizable by a collision detecting signal from said electrical sensor.

12. An inflatable safety bag system according to claim 3, wherein:
    said mechanical sensor includes a piston shiftable in response to a vehicle collision; and
    the actuator means operatively connected to said mechanical valve opening device is actuatable in response to shifting movement of said piston.

* * * * *